United States Patent [19]
Weaver et al.

[11] Patent Number: 5,871,049
[45] Date of Patent: Feb. 16, 1999

[54] CONTROL OF FINE PARTICULATE FLOWBACK IN SUBTERRANEAN WELLS

[75] Inventors: Jim D. Weaver; James R. Stanford; Philip D. Nguyen, all of Duncan; Bobby K. Bowles, Comanche; Steven F. Wilson, Duncan; Brahmadeo Dewprashad, Lawton; Mark A. Parker, Duncan, all of Okla.

[73] Assignee: Halliburton Energy Services, Inc., Duncan, Okla.

[21] Appl. No.: 82,721

[22] Filed: May 21, 1998

Related U.S. Application Data

[60] Division of Ser. No. 858,312, May 19, 1997, Pat. No. 5,775,425, which is a continuation-in-part of Ser. No. 725,368, Oct. 3, 1996, Pat. No. 5,787,986, which is a continuation-in-part of Ser. No. 510,399, Aug. 2, 1995, Pat. No. 5,582,249, which is a continuation-in-part of Ser. No. 412,668, Mar. 29, 1995, Pat. No. 5,501,274.

[51] Int. Cl.$^6$ .................. E21B 33/138; E21B 43/04; E21B 43/267

[52] U.S. Cl. .................. 166/276; 166/280; 166/281; 166/295; 523/131

[58] Field of Search .................. 166/276, 280, 166/281, 295; 507/924; 523/131

[56] References Cited

U.S. PATENT DOCUMENTS

| | | | |
|---|---|---|---|
| 2,187,895 | 1/1940 | Sanders | 166/280 |
| 2,283,753 | 2/1942 | Henderson et al. | 166/295 |
| 3,149,673 | 9/1964 | Pennington | 166/280 |
| 3,363,690 | 1/1968 | Fischer . | |
| 3,443,637 | 5/1969 | Sparlin et al. | 166/295 |
| 3,659,651 | 5/1972 | Graham | 166/280 |
| 3,815,680 | 6/1974 | McGuire et al. | 166/281 |
| 3,973,627 | 8/1976 | Hardy et al. | 166/276 |
| 4,018,285 | 4/1977 | Watkins et al. | 166/295 |
| 4,494,605 | 1/1985 | Wiechel et al. | 166/276 |
| 4,544,208 | 10/1985 | Miller | 166/276 X |
| 4,549,608 | 10/1985 | Stowe et al. | 166/280 |
| 4,829,100 | 5/1989 | Murphey et al. | 166/295 X |
| 4,925,247 | 5/1990 | Hjelmstad | 166/305.1 X |
| 4,969,522 | 11/1990 | Whitehurst et al. | 166/295 X |
| 4,993,491 | 2/1991 | Palmer et al. | 166/280 X |
| 4,995,463 | 2/1991 | Kramm et al. | 166/308 |
| 5,219,026 | 6/1993 | Shu et al. | 166/281 X |
| 5,249,627 | 10/1993 | Harms et al. | 166/281 X |
| 5,330,005 | 7/1994 | Card et al. | 166/280 |
| 5,439,055 | 8/1995 | Card et al. | 166/280 |
| 5,492,178 | 2/1996 | Nguyen et al. | 166/276 |
| 5,501,274 | 3/1996 | Nguyen et al. | 166/276 |
| 5,501,275 | 3/1996 | Card et al. | 166/280 |
| 5,551,514 | 9/1996 | Nelson et al. | 166/280 |
| 5,582,249 | 12/1996 | Caveny et al. | 166/276 |
| 5,652,296 | 7/1997 | Randen | 166/276 |
| 5,697,440 | 12/1997 | Weaver et al. | 166/281 |
| 5,721,302 | 2/1998 | Wood et al. | 166/276 |
| 5,723,538 | 3/1998 | Fischer | 166/276 |

*Primary Examiner*—George Suchfield
*Attorney, Agent, or Firm*—Robert A. Kent

[57] ABSTRACT

The present invention provides a method of treating a wellbore penetrating a subterranean formation with a treatment fluid whereby fine particulate flowback is reduced or prevented. The method includes the steps of providing a fluid suspension including a mixture of a particulate coated with a tackifying compound, pumping the suspension into a subterranean formation and depositing the mixture within the formation whereby the tackifying compound retards movement of at least a portion of any fine particulate within the formation upon flow of fluids from the subterranean formation through the wellbore. Alternatively, the tackifying compound may be introduced into a subterranean formation in a diluent containing solution to deposit upon previously introduced particulates to retard movement of such particulates and any fines subject to flow with production of fluids from the subterranean formation.

19 Claims, 2 Drawing Sheets

TREATED SAMPLE

UNTREATED SAMPLE

CONTROL OF FINE PARTICULATE FLOWBACK IN SUBTERRANEAN WELLS

CROSS-REFERENCE TO RELATED APPLICATIONS

The present application is a divisional application of U.S. application Ser. No. 08/858,312 filed May 19, 1997, now U.S. Pat. No. 5,775,425, which is a continuation-in-part of U.S. application Ser. No. 08/725,368 filed Oct. 3, 1996, now U.S. Pat. No. 5,787,986, which is a continuation-in-part of U.S. application Ser. No. 08/510,399 filed Aug. 2, 1995, now U.S. Pat. No. 5,582,249 which is a continuation-in-part of U.S. application Ser. No. 08/412,668 now U.S. Pat. No. 5,501,274 filed Mar. 29, 1995.

BACKGROUND OF THE INVENTION

1. Field of the Invention

This invention relates to means for recovering hydrocarbons from a subterranean formation and more particularly to a method and means for controlling transport of fine particulate solids produced during a stimulation treatment during the subsequent production of hydrocarbons from a subterranean formation.

2. Brief Description of the Prior Art

Transport of particulate solids during the production of hydrocarbons from a subterranean formation is a continuing problem. The transported solids can erode or cause significant wear in the hydrocarbon production equipment used in the recovery process. The solids also can clog or plug the wellbore thereby limiting or completely stopping fluid production. Further, the transported particulates must be separated from the recovered hydrocarbons adding further expense to the processing.

The particulates which are available for transport may be present due to the nature of a subterranean formation and/or as a result of well stimulation treatments wherein proppant is introduced into a subterranean formation In the treatment of subterranean formations, it is common to place particulate materials as a filter medium and/or a proppant in the near wellbore area and in fractures extending outwardly from the wellbore. In fracturing operations, proppant is carried into fractures created when hydraulic pressure is applied to these subterranean rock formations to a point where fractures are developed. Proppant suspended in a viscosified fracturing fluid is carried outwardly away from the wellbore within the fractures as they are created and extended with continued pumping. Upon release of pumping pressure, the proppant materials remain in the fractures holding the separated rock faces in an open position forming a channel for flow of formation fluids back to the wellbore.

Introduction of the proppant materials into the fracturing fluid often results in the crushing of some portion of the proppant material as it passes through the pumping and mixing equipment to enter the subterranean formation. This fine crushed material may have a particle size ranging from slightly below the size of the original proppant material to less than 600 mesh on the U.S. Sieve Series. Also, when the formation closes at the conclusion of the treatment some crushing of the proppant material may occur producing additional fines. Even when proppant crushing does not occur, the subterranean formation may itself release fines from the face of the created fractures as a result of spalling, scouring of the formation wall which causes formation particulate to be mixed with the proppant and the like. These fine formation materials also may range from formation grain size to less than 600 mesh. The fines may comprise sand, shale or hydrocarbons such as coal fines from coal degasification operations and the like. When the wellbore subsequently is produced, the fines tend to move into the proppant pack in the fracture tending to reduce the permeability of the pack. The fines also can flow with any production from the wellbore to the surface.

This undesirable result causes undue wear on production equipment and the need for separation of solids from the produced hydrocarbons. Fines flowback often may be aggravated by what is described as "aggressive" flowback of the well after a stimulation treatment. Aggressive flowback generally entails flowback of the treatment fluid at a rate of from about 0.001 to about 0.1 barrels per minute (BPM) per perforation of the treatment fluids which were introduced into the subterranean formation. Such flowback rates accelerate or force closure of the formation upon the proppant introduced into the formation. The rapid flowrate can result in large quantities of fines flowing back into the near wellbore as closure occurs causing permeability loss within the formation. The rapid flowback is highly desirable for the operator as it returns a wellbore to production of hydrocarbons significantly sooner than would result from other techniques.

Currently, the primary means for addressing the formation particulate or fines problem is to employ resin-coated proppants or resin consolidation of the proppant which is not capable of use in aggressive flowback situations. Further, the cost of resin-coated proppant is high, and is therefore used only as a tail-in in the last five to twenty five percent of the proppant placement. Resin-coated proppant is not always effective at forming a filtration bed since there is some difficulty in placing it uniformly within the fractures and, additionally, the resin coating can have a deleterious effect on fracture conductivity. Resin coated proppant also may interact chemically with common fracturing fluid crosslinking systems such as guar or hydroxypropylguar with organometallics or borate crosslinkers. This interaction results in altered crosslinking and/or break times for the fluids thereby affecting placement.

In unconsolidated formations, it is common to place a filtration bed of gravel in the near-wellbore area in order to present a physical barrier to the transport of unconsolidated formation fines with the production of hydrocarbons. Typically, such so-called "gravel packing operations" involve the pumping and placement of a quantity of gravel and/or sand having a mesh size between about 10 and 60 mesh on the U.S. Standard Sieve Series into the unconsolidated formation adjacent to the wellbore. Sometimes multiple particle size ranges are employed within the gravel pack. It is sometimes also desirable to bind the gravel particles together in order to form a porous matrix through which formation fluids can pass while straining out and retaining the bulk of the unconsolidated sand and/or fines transported to the near wellbore area by the formation fluids. The gravel particles may constitute a resin-coated gravel which is either pre-cured or can be cured by an overflush of a chemical binding agent once the gravel is in place. It has also been known to add various hardenable binding agents or hardenable adhesives directly to an overflush of unconsolidated gravel in order to bind the particles together. Various other techniques also are described in U.S. Pat. No. 5,492,178, the entire disclosure of which is incorporated herein by reference.

U.S. Pat. Nos. 5,330,005, 5,439,055 and 5,501,275 disclose a method for overcoming the difficulties of resin coating proppants or gravel packs by the incorporation of a fibrous material in the fluid with which the particulates are introduced into the subterranean formation. The fibers generally have a length ranging upwardly from about 2 millimeters and a diameter of from about 6 to about 200 microns. Fibrillated fibers of smaller diameter also may be used. The fibers are believed to act to bridge across constrictions and orifices in the proppant pack and form a mat or framework which holds the particulates in place thereby limiting particulate flowback. The fibers typically result in a 25 percent or greater loss in permeability of the proppant pack that is created in comparison to a pack without the fibers.

While this technique may function to limit some flowback, it fails to secure the particulates to one another in the manner achieved by use of resin coated particulates.

U.S. Pat. No. 5,551,514 discloses a method for sand control that combines resin consolidation and placement of a fibrous material in intimate mixture with the particulates to enhance production without a gravel pack screen.

It would be desirable to provide a method which will bind greater numbers of fines particles to the proppant material in such a manner that it further assists in preventing movement or flowback of particulates from a wellbore or formation without significantly reducing the permeability of the particulate pack during aggressive flowback of treatment fluids.

BRIEF SUMMARY OF THE INVENTION

The present invention provides a method and fluid for treating a subterranean formation and a resultant porous particulate pack that inhibits the flow of fine particulates back through the wellbore with the production of hydrocarbons without significant effects upon the permeability of the particulate pack.

In accordance with a preferred embodiment of the invention, a method of treating a subterranean formation penetrated by a wellbore is provided comprising the steps of providing a fluid suspension including a mixture of particulate material and another material comprising a liquid or solution of a tackifying compound, which coats at least a portion of the particulate upon admixture therewith, pumping the fluid suspension including the coated particulate through the wellbore and depositing the mixture in the formation. Upon deposition of the coated material mixture in the formation the coating causes fine particulate adjacent the coated material to adhere upon contact with the coated material thereby creating agglomerates which bridge against other particles in the formation to prevent particulate flowback and fines migration. The tackifying compound also may be introduced into the subterranean formation prior to or after introduction of the proppant particulate.

The coated material is effective in inhibiting the flowback of fine particulate in a porous pack having a size ranging from about that of the proppant material to less than about 600 mesh in intimate admixture with the tackifying compound coated particulates.

The coated material is effective in consolidating fine particulate in the form of agglomerates in a formation as a result of a fracturing or gravel packing treatment performed on a subterranean formation during aggressive flowback of the treatment fluid.

BRIEF DESCRIPTION OF THE DRAWING FIGURES

FIG. 1 provides a schematic illustration of the test apparatus utilized to determine the critical resuspension velocity for a coated substrate material.

FIG. 2 provides a graphical illustration of sample permeability.

FIGS. 3A and 3B provides photomicrographs of untreated and treated samples illustrating fines retention.

DETAILED DESCRIPTION OF THE INVENTION

Figure 1:
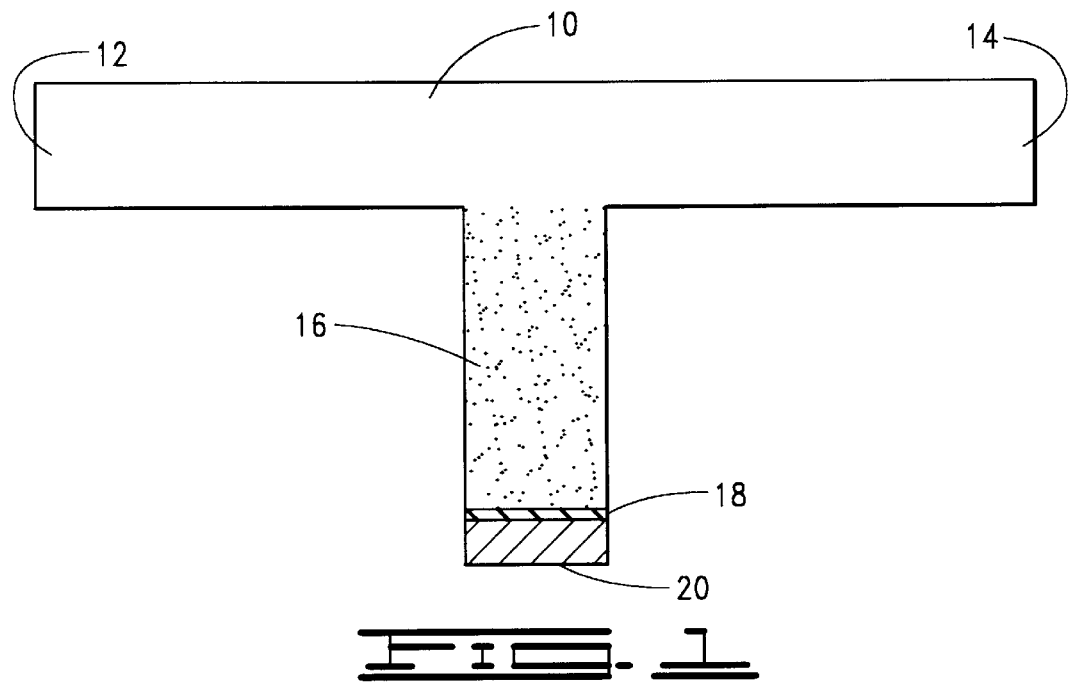

In accordance with the present invention, a liquid or solution of a tackifying compound is incorporated in an intimate mixture with a particulate material such as conventional proppants or gravel packing materials and introduced into a subterranean formation.

As used in this specification, the term "intimate mixture" will be understood to mean a substantially uniform dispersion of the components in the mixture. The term "simultaneous mixture" will be understood to mean a mixture of components that are blended together in the initial steps of the subterranean formation treatment process or the preparation for the performance of the treatment process.

The coated particulate or proppant material may comprise substantially any substrate material that does not undesirable chemically interact with other components used in treating the subterranean formation. The material may comprise sand, ceramics, glass, sintered bauxite, resin coated sand, resin beads, metal beads and the like. The coated material also may comprise an additional material that is admixed with a particulate and introduced into a subterranean formation to reduce particulate flowback. In this instance the additional substrate material may comprise glass, ceramic, carbon composites, natural or synthetic polymers or metal and the like in the form of fibers, flakes, ribbons, beads, shavings, platelets and the like. In this instance, the additional substrate material generally will be admixed with the particulate in an amount of from about 0.1 to about 5 percent by weight of the particulate.

The tackifying compound comprises a liquid or a solution of a compound capable of forming at least a partial coating upon the substrate material with which it is admixed prior to or subsequent to placement in the subterranean formation. In some instances, the tackifying compound may be a solid at ambient surface conditions and upon initial admixing with the particulate and after heating upon entry into the wellbore for introduction into the subterranean formation become a melted liquid which at least partially coats a portion of the particulate. Compounds suitable for use as a tackifying compound comprise substantially any compound which when in liquid form or in a solvent solution will form a non-hardening coating, by themselves, upon the particulate and will increase the continuous critical resuspension velocity of the particulate when contacted by a stream of water as hereinafter described in Example I by in excess of about 30 percent over the particulate alone when present in a 0.5 percent by weight active material concentration. Preferably, the continuous critical resuspension velocity is increased by at least 40 percent over particulate alone and most preferably at least about 50 percent over particulate alone. A particularly preferred group of tackifying compounds comprise polyamides which are liquids or in solvent solution at the temperature of the subterranean formation to be treated such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids which are reacted with polyamines. Other polyacids include trimer acids, synthetic acids produced from fatty acids, maleic anhydride and acrylic acid and the like. Such acid compounds are available from companies such as Witco Corporation, Union Camp, Chemtall, and Emery Industries. The reaction products are available from, for example, Champion Technologies, Inc. and Witco Corporation.

In general, the polyamides of the present invention are commercially produced in batchwise processing of polyacids predominately having two or more acid functionalities per molecule with a polyamine. As is well known in the manufacturing industry, the polyacids and polyfunctional amines are introduced into a reactor where, with agitation, the mildly exothermic formation of the amide salt occurs. After mixing, heat is applied to promote endothermic dehydration and formation of the polymer melt by polycondensation. The water of reaction is condensed and removed leaving the polyamide. The molecular weight and final properties of the polymer are controlled by choice and ratio of feedstock, heating rate, and judicious use of monofunctional acids and amines to terminate chain propagation. Generally an excess of polyamine is present to prevent runaway chain propagation. Unreacted amines can be removed by distillation, if desired. Often a solvent, such as an alcohol, is admixed with the final condensation reaction product to produce a liquid solution that can readily be handled. The condensation reaction generally is accomplished at a temperature of from about 225° F. to about 450° F. under a nitrogen sweep to remove the condensed water from the reaction. The polyamines can comprise, for example, ethylenediamine, diethylenetriamine, triethylene tetraamine, amino ethyl piperazine and the like.

The polyamides can be converted to quaternary compounds by reaction with methylene chloride, dimethyl sulfate, benzylchloride, diethyl sulfate and the like. Typically the quaternization reaction would be effected at a temperature of from about 100° to about 200° F. over a period of from about 4 to 6 hours.

The quaternization reaction may be employed to improve the chemical compatibility of the tackifying compound with the other chemicals utilized in the treatment fluids. Quaternization of the tackifying compound can reduce effects upon breakers in the fluids and reduce or minimize the buffer effects of the compounds when present in various fluids.

Additional compounds which may be utilized as tackifying compounds include liquids and solutions of, for example, polyesters, polycarbonates and polycarbamates, natural resins such as shellac and the like.

The surprising discovery has been made that a tackifying compound can also be produced by the reaction of a polyacid such as previously described with a multivalent ion such as calcium, aluminum, iron or the like. Similarly, various polyorganophosphates, polyphosphonates, polysulfates, polycarboxylates, or polysilicates may be reacted with a multivalent ion to yield a tackifying compound. If retardation of the rate of reaction is desired, esters of the above compounds may be utilized which will then react with the multivalent ion as the esters hydrolyze at the subterranean formation temperatures in the treatment fluids. Alternatively, chelates may be formed with known chelating agents such as citric acid, hydroxypropionates and the like to retard the rate of reaction. Further, it has been found possible to generate the tackifying compound in-situ within the subterranean formation by introduction of the polyacid to contact multivalent ions present in the treatment fluid within the subterranean formation. The multivalent ions may be either naturally occurring in the formation or introduced with the treatment fluid.

The tackifying compound is admixed with the particulate in an amount of from about 0.05 to about 3.0 percent active material by weight of the coated particulate. It is to be understood that larger quantities may be used, however, the larger quantities generally do not significantly increase performance and could undesirably reduce the permeability of the particulate pack. Preferably, the tackifying compound is admixed with the particulate introduced into the subterranean formation in an amount of from about 0.1 to about 2.0 percent by weight of the coated particulate.

When the tackifying compound is utilized with another material that is to be admixed with the particulate and which is to be at least partially coated with the tackifying compound, such as glass fibers or the like, the compound is present in an amount of from about 10 to about 250 percent active material by weight of the glass fibers or other added material and generally from about 0.05 to about 3 percent active material by weight of the quantity of particulate with which the coated material is intimately admixed. Preferably the tackifying compound is present in an amount of from about 10 to about 150 percent of the material which is to be at least partially coated with the tackifying compound and then added to the particulate. At least a portion of the tackifying compound introduced with the additional material will contact and coat at least a portion of the particulate with which it is admixed.

The liquid or solution of tackifying compound interacts mechanically with the particles of particulate introduced into the subterranean formation and the adhered fines to limit or prevent the flowback of fines to the wellbore.

The liquid or solution of tackifying compound generally is incorporated with the particulate in any of the conventional fracturing or gravel packing fluids comprised of an aqueous fluid, an aqueous foam, a hydrocarbon fluid or an emulsion, a viscosifying agent and any of the various known breakers, buffers, surfactants, clay stabilizers or the like.

Generally the tackifying compound may be incorporated into fluids having a pH in the range of from about 3 to about 12 for introduction into a subterranean formation. The compounds are useful in reducing particulate movement within the formation at temperatures from about ambient to in excess of 275° F. It is to be understood that not every tackifying compound will be useful over the entire pH or temperature range but every compound is useful over at least some portion of the range and individuals can readily determine the useful operating range for various products utilizing well known tests and without undue experimentation.

It has been discovered that the incorporation of or addition of certain surfactants to the fluid suspension can improve or facilitate the coating of the tackifying compound upon the particulate. The addition of selected surfactants has been found to be beneficial at both elevated fluid salinity and elevated fluid pH as well as at elevated temperatures. The surfactants appear to improve the wetting of the particulates by the tackifying compound. Suitable surfactants include: nonionics, such as, long chain carboxylic esters such as propylene glycol, sorbitol and polyoxyethylenated sorbitol esters, polyoxyethylenated alkylphenols, alkyphenol, ethoxylates, alkyglucosides, alkanolamine condensates and alkanolamides; anionics, such as, carboxylic acid salts, sulphonic acid salts, sulfuric ester salts and phosphonic and polyphosphoric acid esters; cationics, such as, long chain amines and their salts, quaternary ammonium salts, polyoxyethylenated long chain amines and quaternized polyoxyethylenated long chain amines; and zwitterion, such as n-alkylbetaines.

The liquid or solution of tackifying compound generally is incorporated with the particulate as a simultaneous mixture by introduction into the fracturing or gravel packing fluid along with the particulate. Fracturing fluids are introduced into the subterranean formation at a rate and pressure sufficient to create at least one fracture in the formation into which particulate then is introduced to prop the created fracture open to facilitate hydrocarbon production. Gravel packing treatments generally are performed at lower rates and pressures whereby the fluid can be introduced into a formation to create a controlled particle size pack surrounding a screen positioned in the wellbore without causing fracturing of the formation. Alternatively the gravel pack may be performed without a screen, if consolidatable particulate is utilized, and the pack may fill the wellbore. Thereafter, the pack may be drilled out, flushed or reamed to open a passage in the bore, if necessary. The particulate pack surrounding the wellbore then functions to prevent fines or formation particulate migration into the wellbore with the production of hydrocarbons from the subterranean formation. The tackifying compound may be introduced into the fluid before, after or simultaneously with introduction of the particulate into the fluid. When the tackifying compound is generated in-situ in the formation, the reactants may be introduced individually as described above for the tackifying compound and the multivalent ion source may be naturally occurring or introduced into the formation. The liquid or solution may be incorporated with the entire quantity of particulate introduced into the subterranean formation or it may be introduced with only a portion of the particulate, such as in the final stages of the treatment to place the intimate mixture in the formation in the vicinity of the wellbore. For example, the tackifying compound may be added to only the final 20 to 30 percent of the particulate laden fluid introduced into the formation. In this instance, the intimate mixture will form a tail-in to the treatment which upon interaction within the formation with the particulate will cause the particles to bridge on the agglomerates formed therein and prevent movement of the particles into the wellbore with any produced fluids. The tackifying compound may be introduced into the blender or into any flowline in which it will contact the material to be at least partially coated by the compound. The compound may be introduced with metering pumps or the like prior to entry of the treatment fluid into the subterranean formation.

In an alternate embodiment, the particulate may be premixed with the tackifying compound prior to admixing with a treatment fluid for use in a subterranean formation.

The surprising discovery has been made that when a polyamide is utilized as the tackifying compound, ferrous metal in contact with the treatment fluid has been found to exhibit extended corrosion inhibition. It has been determined that minute amounts of the polyamide are dissolved from the coated particulate by hydrocarbons flowing through the formation and into the wellbore and that such quantities provide extended corrosion protection to the ferrous metals contacted thereby and that also are in contact with aqueous fluids introduced into or produced from the subterranean formation. The polyamide material appears to coat or form a very thin film on the ferrous metal surfaces protecting them from contact with aqueous fluids.

In yet another embodiment of the invention wherein a previously performed fracturing treatment or gravel pack is producing back proppant or formation fines with the production of hydrocarbons, a remedial particulate control treatment may be performed. In this instance, the tackifying compound is admixed with a diluent, such as for example, crude oil, distillates, butyl alcohol, isopropyl alcohol, a heavy aromatic solvent such as xylene, toluene, heavy aromatic naptha or the like, mutual solvents such as ethylene glycol monobutyl ether, propylene carbonate or n-methylpyrolidone or the like. The tackifying compound generally will be present in an amount of from about 0.5 to about 30 percent by volume of the solution to be used to treat the subterranean formation. The tackifying compound also may be admixed with selected surfactants and other additives that do not adversely react with the compound to prevent fines control. The tackifying compound containing solution is introduced into the subterranean formation preferably at a rate and pressure below the fracture gradient for the subterranean formation. The tackifying compound tends to contact and at least partially coat at least a portion of the proppant or gravel which previously has been introduced into the formation.

The coating of the proppant or gravel causes the larger particles to subsequently tend to adhere to one another resulting in the formation of particulate bridges in the formation upon the resumption of hydrocarbon production. As fines in the produced fluids contact the tackifying compound coated particulates in the subterranean formation, the fines tend to become bound to the larger particulates and are prevented from migrating through the proppant or gravel pack with produced hydrocarbons. Introduction of the tackifying compound solution into the subterranean formation at matrix flow rates (rates below that necessary to exceed the fracture gradient and cause fracture formation) tends to minimize the possibility of additional fines release within the formation. If it is desired to redistribute proppant in a subterranean formation or reopen or extend fractures into the subterranean formation, the tackifying compound solution can be introduced into the subterranean formation at a rate and pressure sufficient to fracture the subterranean formation. Any fines that may be produced as a result of the fracturing operation tend to become bound to and adhere to the particulate that is at least partially coated by the tackifying compound as it is deposited within the subterranean formation.

To further illustrate the present invention and not by way of limitation, the following examples are provided.

EXAMPLE I

The evaluation of a liquid or solution of a compound for use as a tackifying compound is accomplished by the following test. A critical resuspension velocity is first determined for the material upon which the tackifying compound is to be coated. Referring now to FIG. 1, a test apparatus is illustrated for performing the test. The apparatus comprises a ½" glass tee 10 which is connected to an inlet source 12 of water and an outlet 14 disposal line is blocked to fluid flow. A water slurry of particulate is aspirated into the tee 10 through inlet 12 and collected within portion 16 by filtration against a screen 18. When portion 16 of tee 10 is full, the vacuum source is removed and a plug 20 is used to seal the end of portion 16. The flow channel from inlet 12 to outlet 14 then is swabbed clean and a volumetrically controlled pump, such as a "MOYNO" pump, is connected to inlet 12 and a controlled flow of water is initiated. The velocity of the fluid is slowly increased through inlet 12 until the first particle of particulate material is picked up by the flowing water stream. This determines the baseline for the starting of the resuspension velocity. The flow rate then is further increased until the removal of particles becomes continuous. This determines the baseline for the continuous resuspension velocity. The test then is terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test is repeated to determine the starting point of particulate removal and the velocity at which removal becomes continuous. The percent of velocity increase (or decrease) then is determined based upon the initial or continuous baseline value. The results of several tests employing the preferred polyamide of the present invention, and conventional epoxy and phenolic resins known for use in consolidation treatments in subterranean formations with 12/20 and 20/40 mesh sand are set forth below in Table I.

TABLE I

| Test No. | Particulate Size | Coating Agent, % V/Wt Particulate | Percent Of Velocity Change At | |
|---|---|---|---|---|
| | | | Starting | Continuous |
| 1 | 20/40/mesh sand | none | 0 | 0 |
| 2 | 20/40 mesh sand | ½ percent polyamide | 192 | 222 |
| 3 | 20/40 mesh sand | 1 percent polyamide | 271 | 391 |
| 4 | 20/40 mesh sand | ½ percent phenolic | −0.5 | 6.5 |
| 5 | 20/40 mesh sand | 1 percent phenolic | −9 | −6.8 |
| 6 | 20/40 mesh sand | ½ percent epoxy | −9 | −1.2 |
| 7 | 20/40 mesh sand | 1 percent epoxy | 5.2 | 12.2 |
| 8 | 12/20 mesh sand | ½ percent polyamide | 228 | 173 |
| 9 | 12/20 mesh sand | 1 percent polyamide | 367 | 242 |
| 10 | 12/20 mesh sand | ½ percent phenolic | 42 | 22 |
| 11 | 12/20 mesh sand | 1 percent phenolic | 42 | 13 |
| 12 | 12/20 mesh sand | ½ percent epoxy | 48 | 30 |
| 13 | 12/20 mesh sand | 1 percent epoxy | 38 | 15 |

The data clearly illustrates the substantial increase in the critical resuspension velocity of a particulate coated with the tackifying compound in comparison to other known formation consolidation agents which require hardening to be effective.

EXAMPLE II

To illustrate the ability of the tackifying compound to control fines, the following tests were performed.

Two sand slurries were prepared and placed in 1 inch diameter, 36 inch tall glass columns having a screen and a one hole plug stopper at their lower ends which was sealed off. The slurries comprised 250 ml. of a 25 lb/1000 gallon hydrated guar, 300 grams 20/40 mesh Brady sand containing 7.4% by weight of 50 mesh and smaller fines material, 0.5 ml enzyme breaker and 0.5 ml. borate crosslinker. One percent by weight of the tackifying compound of the present invention was added to the second slurry.

The slurries were allowed to sit static for 48 hours. The first column settled to a height of 21.125 inches and the tackifying compound containing sample settled to a height of 21.875, inches.

The broken fluids were removed from the columns above the settled sand in the columns and replaced with water. The columns were attached to a constant head water supply. While maintaining the water supply constant, the hole in the bottom stopper was opened, water flow rates and permeabilities were determined. The sand packs had settled during the water flow to 20.5 inches and 21.625 inches respectively.

The flow was resumed, using kerosene and flow rates and permeabilities were determined. Pack heights settled to 20.125 inches and 21.437 inches, respectively.

Figure 2:
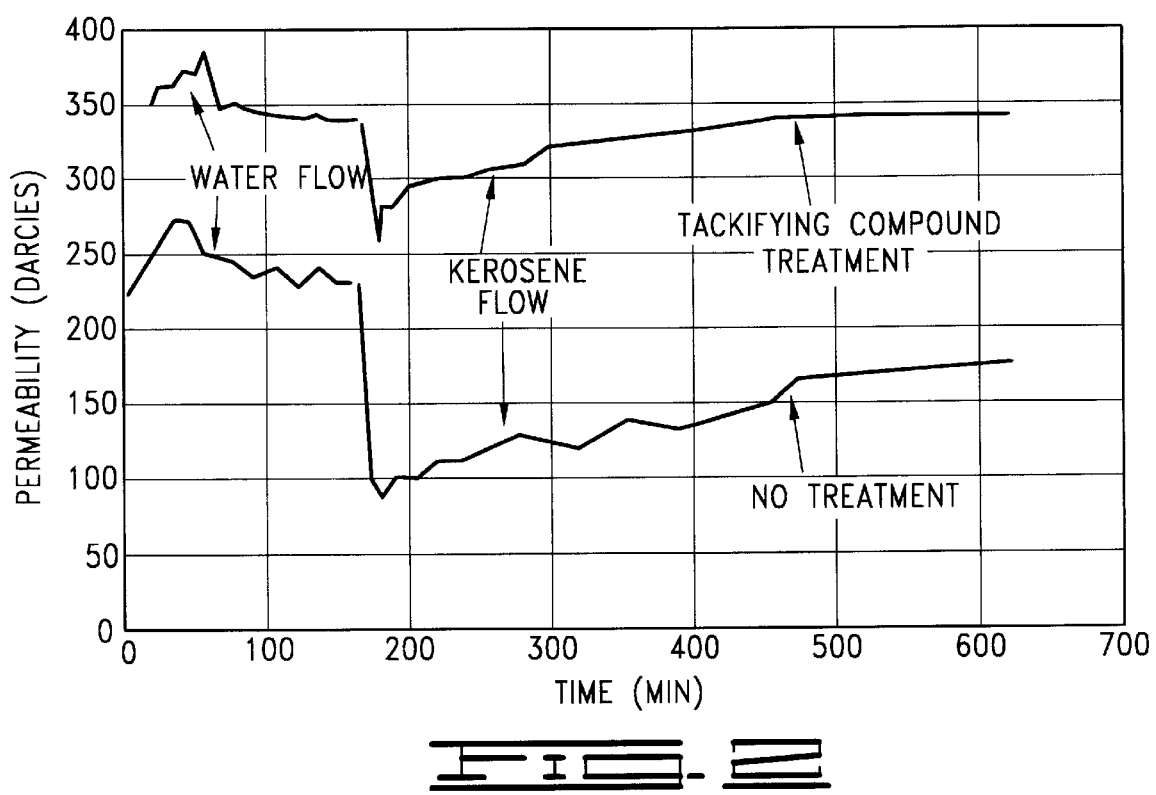

The difference in the permeability of the packs in the columns is illustrated in the chart comprising FIG. 2. The difference in the final pack height is an indication of the agglomeration of the fines with the larger particles preventing close packing by fines movement as occurs in the untreated column. The lower permeability of the untreated pack also indicates fines migration has occurred.

The stabilization properties of the method of the present invention also are determined by flow through an American Petroleum Institute approved simulated fracture flow cell.

The cell contains Ohio sandstone cores having a proppant bed size of about 1.5 inches in height, about 7 inches in length and about 0.25 inches in width between the cores. The bed is initially prepacked with 20/40 mesh sand by introducing the sand into the cell in an aqueous slurry or a gelled fluid containing 40 pounds of guar per 1000 gallons of aqueous fluid. The cell is fitted with a 0.3 inch hole at one end to simulate a perforation. The hole is visible through a sight glass so that proppant production, if any, through the hole can be visually determined.

The conductivity of the pack is determined at a stress loading of 2000 and 3000 psi for the untreated sand.

The cell then was cleaned and packed with another proppant pack containing 0.5 percent by weight tackifying compound for testing. The results of the tested materials are set forth in Table II, below.

TABLE II

| | CONDUCTIVITY, mD/ft at | |
|---|---|---|
| | 2000 psi loading | 3000 psi loading |
| untreated sample | 4251 | 3487 |
| treated sample | 5130 | 3829 |

Figure 3A:
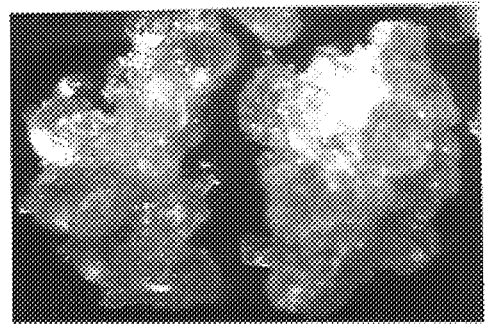
Figure 3B:
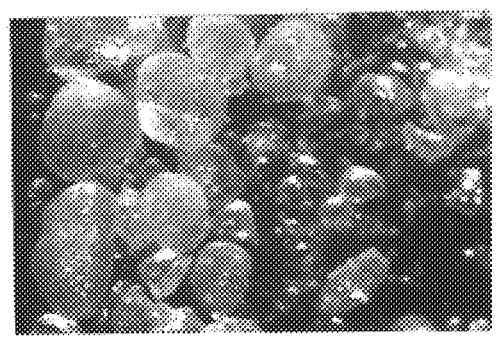

FIGS. 3A and 3B present photomicrographs of a portion of the sand packs from the untreated and treated samples after removal from the flow cell. The difference in the free fines content of the two samples is readily apparent in the photos. The untreated sample contains significant quantities of free fines whereas the fines are found to be primarily attached to the larger sand particles in the treated sample.

EXAMPLE III

To illustrate the effectiveness of the tackifying compound in controlling fines, the following turbidity tests were performed. A series of samples were prepared containing a quantity of 100 grams of 20/40 Brady frac sand admixed with 100 ml of tap water. A selected quantity of tackifying compound was admixed with a sample and the turbidity of the solution was determined. The turbidity was measured in Formazin Turbidity Units utilizing a Coleman Junior II Spectrophotometer, Model 6-20. The results are set forth in Table III, below.

TABLE III

| SAMPLE | TACKIFYING COMPOUND, ml | TURBIDITY, FTU |
|---|---|---|
| 1 | 0 | 43 |
| 2 | 0.25 | 38 |
| 3 | 0.5 | 18 |
| 4 | 1.0 | 12 |

The tests were repeated using 20/40 Brady frac sand to which is added 0.2 grams of silica flour to simulate a high fines content. The turbidity was measured as previously described. The results are set forth in TABLE IV, below.

TABLE IV

| SAMPLE | TACKIFYING COMPOUND, ml | TURBIDITY, FTU |
|---|---|---|
| 1 | 0 | 337 |
| 2 | 0.25 | 137 |
| 3 | 0.5 | 56 |
| 4 | 1.0 | 29 |

The data clearly illustrates the ability of the tackifying compound to control fines movement in the fluid and to bind the fines to proppant materials which are coated by the tackifying compound.

EXAMPLE IV

To illustrate the effect of the tackifying compound on controlling fines migration in coal seams two treatments are performed on adjacent wells in Colorado on a gas containing coal seam producing at a depth of from about 1850 to about 2100 ft. at a bottomhole temperature of about 110° F. The treatments are performed down 5½ inch casing. The treatments comprised approximately 2000 gallons of 15% acetic acid, 24,000 gallons of a guar containing pad, 60,000 gallons of a fracturing treatment including approximately 300,000 pounds of 12/20 sand and 2000 gallons of flush fluid. The fracturing fluid comprised a borate crosslinked fluid containing 20 lbs guar per 1000 gallons of fluid. The fluid also contained clay control additives, surfactants, gel breakers and biocide. One treatment included approximate 1.0 percent tackifying compound added to the sand during performance of the treatment.

The initial production of the wells was about 180 MCF per day and about 180 BWPD. Post frac production after cleanup of fracturing treatment fluid on the well without fines control is about 500 MCF and about 400 BWPD. The well having the treatment utilizing fines control techniques of the present invention after clean up of fracturing treatment fluid is producing about 800 MCF per day and about 600 BWPD. The first well is producing fracturing treatment sand and coal fines into the wellbore along with the production of gas. The well treated with the tackifying compound is not producing measurable amounts of fines or fracturing treatment sand.

EXAMPLE V

To illustrate the corrosion inhibition of a film of the tackifying compound comprising polyamides, the following tests were performed on carbon steel coupons weighing approximately 1 gram at 160° F. in simulated sweet and sour well conditions.

Test fluids are placed in sealed bulk containers and purged for a minimum of six hours with carbon dioxide. For sour gas tests, $H_2S$ then is bubbled into the container for 15 to 20 minutes. The proper amount of polyamide is dispensed by syringe into each test bottle. The test bottles are 7 ounce capacity. The blank samples contain no polyamide. Each bottle is purged with carbon dioxide to displace air and a previously weighed and cleaned sample coupon is placed in the bottle. A quantity of 108 ml of NACE brine and 12 ml of kerosene then are added to the bottles from the purged bulk containers. The bottles are capped and placed on a rotating wheel and rotated for 1 hour at 160° F.±10° F. The bottles then are removed from the wheel and the coupons are transferred to bottles containing brine and kerosene without inhibitor under a carbon dioxide purge to rinse the coupons. The blanks are not transferred since the blank sample bottles contain no inhibitor. The bottles are returned to the rotating wheel for an additional hour. The bottles then are removed from the wheel and the coupons are transferred to bottles having the same brine and kerosene mix without the polyamide. The transfer is effected under a carbon dioxide purge and the bottles are returned to the wheel for an additional 72 hours at about 160° F. to determine corrosion effects on the samples. Samples containing $H_2S$ were returned to the wheel only for 24 hours. After completion of the exposure time, the coupons are retrieved from the bottles, cleaned, dried and weighed. The corrosion loss then is determined. Each sample is run in triplicate and the values are averaged to determine the loss for a sample condition. The results of the tests are set forth in Table V below.

TABLE V

| Sample | Polyamide Concentration, ppm | $H_2S$ Present | Corrosion Rate, lbs/ft2 |
|---|---|---|---|
| 1 | 0 | No | 8.564 |
| 2 | 2500 | No | 1.233 |
| 3 | 50 | No | 1.103 |
| 4 | 0 | Yes | 3.193 |
| 5 | 2500 | Yes | 0.183 |
| 6 | 50 | Yes | 0.455 |

The polyamide film formed on the ferrous metal surface in contact with the aqueous fluid provided significant corrosion protection in comparison to samples having no film as a result of contact with the tackifying compound.

While the present invention has been described with regard to that which is currently considered to comprise the preferred embodiments of the invention, other embodiments have been suggested and still other embodiments will occur to those individuals skilled in the art upon receiving the foregoing specification. It is intended that all such embodiments shall be included within the scope of the present invention as defined by the claims appended hereto.

What is claimed is:

1. A remedial treating method to reduce the production of introduced particulates or formation fines with hydrocarbon fluid production from a subterranean formation penetrated by a wellbore comprising the steps of:

introducing a solution of an effective amount of a tackifying compound and a diluent into a subterranean formation to contact particulates previously introduced into said subterranean formation;

depositing at least a portion of said tackifying compound upon at least a portion of said previously introduced particulate in said subterranean formation; and flowing back fluid from said subterranean formation whereby the tackifying compound coated particulate retards movement of at least a portion of said introduced particulates within the subterranean formation and retards movement of at least a portion of any fines moving with said flowback fluid.

2. The method of claim 1 wherein said tackifying compound is present in said solution in an amount of from about 0.5 to about 30 percent by volume of said solution.

3. The method of claim 1 wherein said introduction of said solution into said subterranean formation is effected at a rate and pressure below that necessary to fracture said subterranean formation.

4. The method of claim 1 wherein said diluent comprises at least one member selected from the group of butylalcohol, isopropyl alcohol, xylene, toluene, heavy aromatic naptha, ethyleneglycolmonobutylether, propylene carbonate and n-methylpyrolidone.

5. A treating method to reduce the production of coal fines from a subterranean coal formation penetrated by a wellbore comprising the steps of:

introducing a fluid containing a proppant into the subterranean formation penetrated by the wellbore;

introducing a solution of an effective amount of a tackifying compound and a diluent into said subterranean formation to contact at least a portion of said introduced proppant; and depositing at least a portion of said tackifying compound upon at least a portion of said introduced proppant in said subterranean formation whereby upon flowing back fluid from said formation, said tackifying compound coated proppant retards movement of at least a portion of any coal fines moving with said flowback fluid.

6. The method of claim 5 wherein said tackifying compound is present in said solution in an amount of from about 0.5 to about 30 percent by volume of said solution.

7. The method of claim 5 wherein said introduction of said solution into said subterranean formation is effected at a rate and pressure below that necessary to fracture said subterranean formation.

8. The method of claim 5 wherein said diluent comprises at least one member selected from the group of butyl alcohol, isopropyl alcohol, xylene, toluene, heavy aromatic naptha, ethyleneglycolmonobutylether, propylene carbonate and n-methylpyrolidone.

9. The method of claim 5 wherein said tackifying compound comprises a liquid or solution of a polyamide.

10. The method of claim 5 wherein said tackifying compound comprises predominately a condensation reaction product of a dimer acid containing some trimer and higher oligomers and some monomer acids with a polyamine.

11. The method of claim 10 wherein said polyamine comprises at least one member selected from the group of ethylenediamine, diethylenetriamine, triethylenetetraamine, tetraethylene pentaamine and aminoethylpiperazine.

12. A treating method to reduce the production of formation fines with fluid production from a subterranean formation penetrated by a gravel packed wellbore comprising the steps of:

introducing a solution of an effective amount of a tackifying compound and a diluent into a wellbore penetrating a subterranean formation which contains a gravel pack of previously introduced particulates; and depositing at least a portion of said tackifying compound upon at least a portion of said previously introduced particulates whereby upon further production of fluid from said subterranean formation, said tackifying compound coated particulate retards movement of at least a portion of any formation fines moving with said produced fluid.

13. The method of claim 12 wherein said fines are coal fines and said subterranean formation is a subterranean coal formation.

14. The method of claim 12 wherein said tackifying compound is present in said solution in an amount of from about 0.5 to about 30 percent by volume of said solution.

15. The method of claim 12 wherein said introduction of said solution into said subterranean formation is effected at a rate and pressure below that necessary to fracture said subterranean formation.

16. The method of claim 12 wherein said diluent comprises at least one member selected from the group of butyl alcohol, isopropyl alcohol, xylene, toluene, heavy aromatic naptha, ethyleneglycolmonobutylether, propylene carbonate and n-methylpyrolidone.

17. The method of claim 12 wherein said tackifying compound comprises a liquid or solution of a polyamide.

18. The method of claim 12 wherein said tackifying compound comprises predominately a condensation reaction product of a dimer acid containing some trimer and higher oligomers and some monomer acids with a polyamine.

19. The method of claim 18 wherein said tackifying compound comprises predominately a condensation reaction product of a dimer acid containing some trimer and higher oligomers and some monomer acids with a polyamine.

* * * * *